United States Patent
Strange et al.

[15] 3,686,835
[45] Aug. 29, 1972

[54] FILTER CASSETTE WITH REMOVABLE CAPSULE

[72] Inventors: John P. Strange, Murrysville; Stanley P. Nebash, Pittsburgh; Alexander C. McInnes, Export; Paul W. McConnaughey, Pittsburgh, all of Pa.

[73] Assignee: Mine Safety Appliances Company, Pittsburgh, Pa.

[22] Filed: Nov. 27, 1970

[21] Appl. No.: 93,275

[52] U.S. Cl. ................55/270, 55/359, 55/501, 55/503, 73/28, 73/421.5, 210/445
[51] Int. Cl. ...........................................B01d 27/08
[58] Field of Search............55/270, 385, 485–487, 55/494, 501, 502, 503, 504, 509, 510, 511, 359, DIG. 31; 210/446–448, 445; 73/28, 421.5

[56] References Cited

UNITED STATES PATENTS

| | | |
|---|---|---|
| 2,068,858 | 1/1937 | Jones...........................55/502 |
| 2,931,507 | 4/1960 | Kent............................210/445 |
| 3,615,257 | 10/1971 | Frost et al....................210/447 |

*Primary Examiner*—Bernard Nozick
*Attorney*—Brown, Murray, Flick & Peckham

[57] ABSTRACT

A shallow cup of non-hygroscopic material has a central inlet opening in its base and a filter disc closing its open end, whereby a hollow capsule is formed. A separable two-part cassette contains the capsule, with the marginal area thereof clamped between the two parts. One part contains the cup and has an end wall provided with a central inlet port registering with the cup inlet, and the other part of the cassette covers the filter and has an end wall provided with a central outlet port. The filter forms one wall of a chamber between it and the end wall of the last-mentioned part of the cassette. After a period of filtering, the cassette is opened and the preweighed capsule is removed and weighed again to determine the amount of particulate matter captured by the capsule.

11 Claims, 5 Drawing Figures

PATENTED AUG 29 1972 3,686,835

FILTER CASSETTE WITH REMOVABLE CAPSULE

In many industries it is highly desirable to make periodic measurements of airborne dust, particularly respirable dust that reaches the lower lung and remains there. Respirable dust particles usually are below 5 micron size. Larger particles are usually considered non-respirable and of no material hygienic significance. One system of dust sampling utilizes a sampling kit having a battery powered pump, a cyclone separator and a filter unit. The pump draws dust-laden air through the cyclone and filter unit in succession. The larger dust particles are separated from the air in the cyclone, while the respirable particles are trapped by the filter. The filter unit is carefully weighed before it is placed in the sampling kit and, after an appropriate sampling period, it is removed and again weighed. The difference in weights is the amount of dust trapped by the filter, from which the dust weight per cubic meter of air can be determined. Federal regulations require that the weight of the removable filter unit not exceed 5 grams and that it be pre-weighed by the manufacturer with a precision of ± 0.1 milligram. Also, the unit must be made of non-hygroscopic material so that its weight will not be affected by moisture. These exacting regulations have been difficult to comply with.

It is among the objects of this invention to provide a filter unit that complies with the above-mentioned federal regulations, and that is easy to handle. cassette The preferred embodiment of the invention is illustrated in the accompanying drawings, in which FIG. 1 is a perspective view of the filter unit; together.

Figure 1:
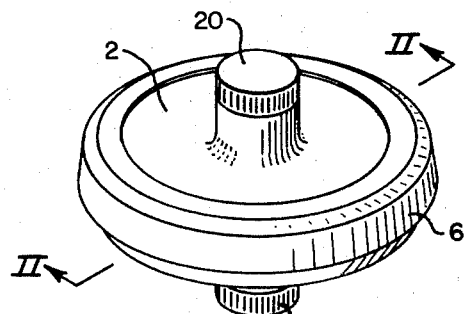
Figure 4:
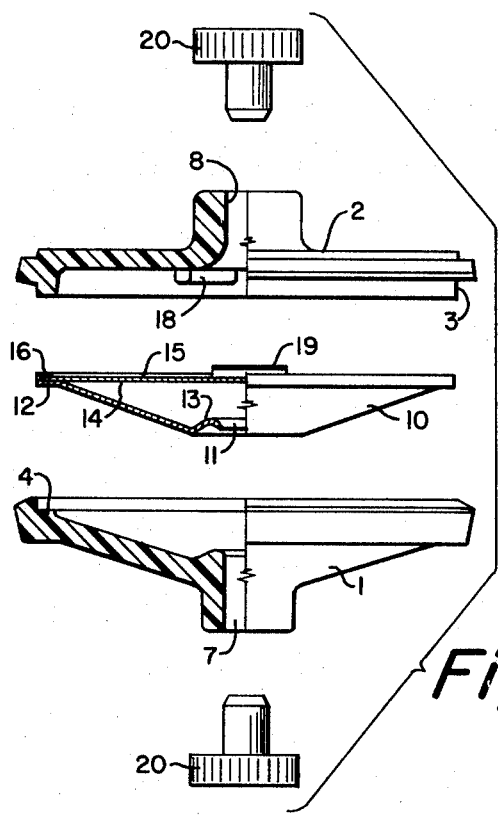
FIG. 4 is an exploded view of the unit, partly in section.
Figure 2:
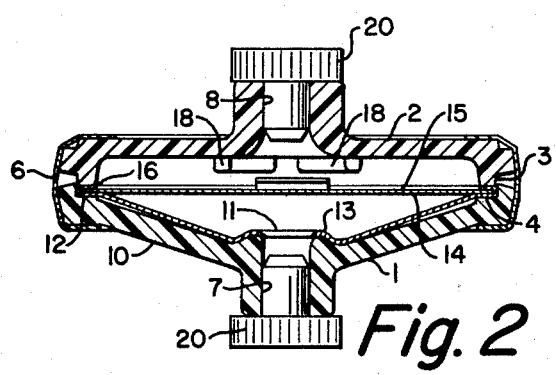
FIG. 2 is a vertical section taken on the line II—II of FIG. 1.
Figure 5:
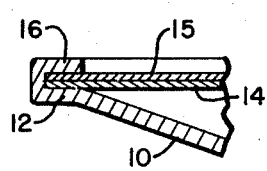
FIG. 5 is an enlarged detail.
Figure 3:
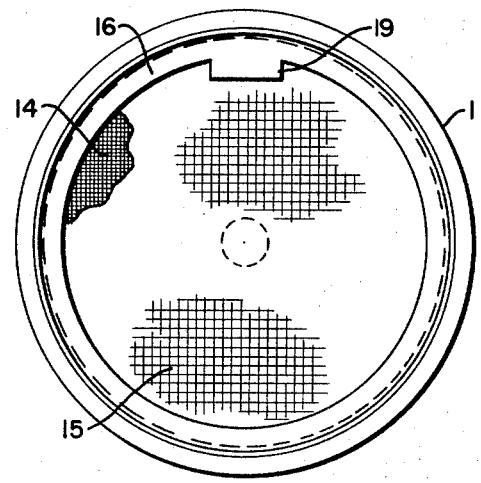
FIG. 3 is a plan view of the capsule in the lower part of the cassette.

Referring to the drawings, a cassette is formed from two shallow cup-like parts 1 and 2 that normally are sealed together but which can easily be separated. It is preferred to mold them from a plastic. One part is provided with an annular rib 3 that fits snugly enough in the other part to provide a seal, and the other part has an internal annular shoulder 4 in its open end opposing the rib. The two parts can be held together by an encircling tape 6 shrunk onto them. The tape also serves as an additional seal. However, if the tape holds the two parts of the cassette together tightly enough and forms a good enough seal in itself, it is not necessary that rib 3 form a seal with the other part of the cassette. The end wall of one part of the cassette is provided with a central inlet port 7, while the end wall of the other part is provided with a central outlet port 8. By making these ports different sizes, or by providing their side walls with different outside diameters, there is no danger of becoming confused and connecting the wrong ports to the pump and cyclone separator of a dust sampling kit.

Removably disposed inside the cassette is a filter capsule that is formed from three elements. One of these is a shallow cup 10, preferably made of aluminum foil, but it also can be made of a high density, non-hygroscopic, stiff plastic with a very thin wall. The cup has a central inlet opening 11 in its base and an internal annular shoulder 12 in its large upper end. It is best to make the cup conical to simplify its manufacture and to reduce the material required to a minimum. The inlet is at the apex of the cup and is encircled by an inturned rim 13. Seated against the cup shoulder is the second element of the capsule, a thin filter membrane 14 in the form of a disc. The third element of the capsule is a highly porous retaining disc 15 of the same size as the filter, the outside of which it engages and covers. These two discs are held in the cup by an inturned flange 16 integral with the open end of the cup and overlapping the margin of the retaining disc, so the edges of the two discs are clamped between that flange and cup shoulder 12. The retaining disc is made of non-hygroscopic material, and it is very light in weight, tough and durable. The serial number of the capsule can be printed on this disc. The flange 16 can be omitted if the edges of the two discs are cemented or heat sealed to the cup.

The capsule is placed in the cassette by inserting it in the inlet half 1 of the cassette. Preferably, this part of the cassette is the same shape as the cup and is the part that contains shoulder 4. The cassette and cup snugly engage each other at the inner end of the cassette inlet port 7. After the capsule has been placed in the inlet half of the cassette, the other half of the cassette is assembled with the first part. The rib 3 engages the flange of the capsule and clamps the flange and the capsule shoulder and the edges of the two discs tightly between the rib and cassette shoulder. The shrink tape then is applied to hold the capsule together until it has been used.

Air entering the inlet port of the cassette will pass through the capsule and leave through the outlet port 8. Spaced arcuate projections 18 in the top of the cassette prevent the retaining disc from being drawn up against the top wall and closing the outlet. Dust particles in the air will be trapped in the capsule by the filter. After a given period of time, the cassette is opened and the capsule removed. Removal can be facilitated by providing the cup flange with an integral tab 19 that can be grasped by tweezers to pull the capsule out of the conical half of the cassette. Dust particles which entered the capsule but did not adhere to the filter disc remain inside the capsule, in which rim 13 around the inlet opening will help to retain them, so loss of dust during collection and subsequent handling is minimized.

Plugs 20 seal the inlet and outlet ports of the cassette until the unit is placed in use. These plugs can be used later, after the unit is removed from the rest of the sampling apparatus, to protect the dust sample until the capsule is removed from the cassette and weighed.

The filter capsule disclosed herein is made of non-hygroscopic material and has a very low tare weight relative to the dust sample weight. The filter disc is protected by the cup and the retaining disc, and there is no loss of filter disc material due to adhesion to the cassette when the capsule is removed. The capsule can easily be inserted in and removed from the cassette, which forms a sturdy protective housing for the capsule.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A filter unit comprising a shallow cup formed of non-hygroscopic material and having a central inlet opening in its base and an annular shoulder at its open end, a filter disc in the cup seated against said shoulder, a porous retaining disc covering the filter disc, means for securing the discs in place so that a hollow capsule is formed, and a separable two-part cassette removably containing the capsule with said shoulder and marginal areas of the discs clamped between said parts, one of said cassette parts containing said cup and having an end wall provided with a central inlet port registering with said cup inlet, the capsule and cassette engaging each other at the inner end of said inlet port, and the other of the cassette parts covering said discs and having an end wall provided with a central outlet port, the retaining disc forming one wall of a chamber between that disc and the end wall of said other part of the cassette.

2. A filter unit according to claim 1, in which the open end of one of said cassette parts is provided with an internal annular shoulder and the open end of the other part of the cassette is provided with an annular rib, said cup shoulder and discs being clamped between said cassette shoulder and rib.

3. A filter unit according to claim 1, in which said cassette is provided around said outlet port with projections in said chamber spacing said retaining disc from the end wall of said other part of the cassette.

4. A filter unit according to claim 1, including a removable sealing tape encircling the cassette at the joint between its two parts and holding them together.

5. A filter unit according to claim 1, in which said cup flange is provided with an inwardly projecting tab for easy removal of the capsule from the opened cassette.

6. A filter unit according to claim 1, in which said cup is provided with an inturned rim around its inlet opening.

7. A filter unit according to claim 1, in which said cup is made of metal foil and has an integral flange around its open end overlapping the margin of the retaining disc.

8. A filter unit according to claim 1, in which said cup is conical with its inlet opening at its apex.

9. A filter unit according to claim 8, in which the inside of said one part of the cassette is conical and conforms to and engages the conical cup.

10. A filter unit according to claim 8, in which the inside of said one part of the cassette is conical and conforms to and engages the conical cup, the open end of said one part is provided with an internal annular shoulder, the open end of said other part of the cassette is provided with an annular rib opposed to that shoulder, and the marginal area of the capsule is clamped between the cassette shoulder and rib.

11. A filter unit according to claim 8, including a removable sealing tape encircling the cassette at the joint between its two parts and holding them together.

* * * * *